[headers omitted]

3,129,259
SUGAR ACID DERIVATIVES OF ARALKYLHYDRAZINES
Thomas Samuel Gardner, Rutherford, John Lee, Montclair, and Edward Wenis, Leonia, N.J., assignors to Hoffmann-La Roche Inc., Nutley, N.J., a corporation of New Jersey
No Drawing. Filed Sept. 29, 1959, Ser. No. 843,042
11 Claims. (Cl. 260—562)

This invention relates to sugar acid derivatives of aralkylhydrazines. The compounds of this invention may more particularly be represented by the structural formula (I)
$HOCH_2(CHOH)_n-CO-NH-NH$-lower alkylene—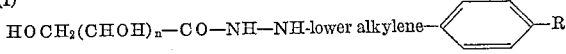—R wherein R represents hydrogen or di-lower alkylamino and $n$ represents the integers 3 or 4. Acid addition salts of such compounds are also within the scope of the invention.

In the compounds of Formula I, the acyl moiety is radical of 5 to 6 carbon atom sugar acids such as arabonoyl, ribonoyl, xylonoyl, lyxonoyl, gluconoyl, mannonoyl, and the like. The D, L or DL forms may be used. The lower alkylene groups in the formula are straight chain or branched chain saturated, aliphatic hydrocarbon groups having up to about 7 carbon atoms and a free linkage at each end of the radical for attachment to the nitrogen and phenyl, respectively. Similar alkyl groups may make up the tertiary amine group represented by the symbol R.

Preferred are compounds which are represented by the formulas (II)
$HOCH_2(CHOH)_{3-4}-CO-NH-NH-CH_2$—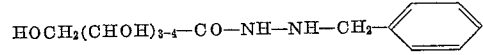

(III)
$HOCH_2(CHOH)_{3-4}-CO-NH-NH-CH_2$—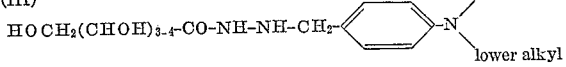—N(lower alkyl)(lower alkyl)

especially when there are three —CHOH— groups.

The compounds of this invention are produced by reacting a lactone of a sugar acid with an aralkylhydrazine or dialkylaminoaralkylhydrazine preferably in a solvent and heating at about reflux temperature. Illustrative lactones are the following: D-ribonolactone, D-gluconolactone, D-galactonolactone, D-arabonolactone, and the like, as well as their L-isomers and racemic mixtures thereof.

Hydrazines which react with the above named lactones include, for example, benzyl hydrazine, phenethyl hydrazine, α-methyl-2-phenethyl hydrazine, γ-phenylpropyl hydrazine, p-dimethylaminobenzyl hydrazine, p-diethylaminobenzyl hydrazine, p-dimethylaminophenethyl hydrazine, etc. Solvents for the reaction are preferably alcoholic solvents such as ethanol.

The compounds of this invention form acid addition salts with inorganic and organic acids, primarily strong acids, such as the hydrohalic acids, e.g., hydrochloric, hydrobromic, etc., other mineral acids, such as sulfuric, phosphoric, nitric and the like, and organic acids such as formic acid, trichloracetic acid, oxalic acid, sulfonic acids including alkanesulfonic acids such as ethanesulfonic acid or arylsulfonic acids such as toluenesulfonic acid, benzenesulfonic acid, etc. The salts formed with the hydrohalic acids and especially hydrochloric acid, are preferred.

The compounds of this invention are useful as antidepressants. They are amine oxidase inhibitors which stimulate the central nervous system and are particularly useful in psychotherapy for relief of disturbed or depressed states. The free hydrazine or a medicinally acceptable acid addition salt thereof may be administered orally or parenterally by incorporating therapeutic dosages in conventional solid or liquid vehicles to form tablets, capsules, injectables, etc., according to accepted pharmaceutical practice.

The following examples are illustrative of the invention. All temperatures are stated in degrees centigrade.

*Example 1*

50 g. of D-ribonolactone and 50 g. of benzyl hydrazine in 140 ml. of ethanol and 10 ml. of water were heated at reflux for 4 hours. On cooling, the product crystallized and was recovered by filtration. The D-1-ribonoyl-2-benzyl-hydrazine was recrystallized from ethanol, M.P. 148–150°.

*Analysis.*—Calculated for $C_{12}H_{18}N_2O_5$: C, 53.4; H, 6.7. Found: C, 53.4; H. 6.7.

About 2 g. of D-1-ribonoyl-2-benzyl-hydrazine were dissolved in sufficient hot ethanol to dissolve the material. To the solution was added an excess proportion of hydrogen chloride in ethanol. Upon cooling, D-1-ribonoyl-2-benzyl-hydrazine hydrochloride precipitated, M.P. 110–112°.

The methanesulfonate, M.P. 151–152°, ethanesulfonate, M.P. 126–127°, and p-toluenesulfonate, M.P. 142–143°, were prepared by the same procedure except that ether was added to precipitate the salt after cooling the ethanol solution.

*Example 2*

57 g. of D-ribonolactone and 55 g. of 4-dimethylaminobenzyl hydrazine in 500 ml. of ethanol were refluxed for 4 hours. On cooling, the product crystallized. The D-1-ribonoyl-2-(4-dimethylaminobenzyl)-hydrazine was recrystallized twice from hot water, M.P. 155–157°.

*Analysis.*—Calculated for $C_{14}H_{23}N_3O_5$: C, 53.7; H, 7.4; N, 13.4. Found: C, 53.7; H, 7.3; N, 13.3.

D-1-ribonoyl-2-(4-dimethylaminobenzyl)-hydrazine hydrochloride was prepared as described in Example 1. The crystalline, hygroscopic product was precipitated with ether after cooling of the ethanolic reaction mixture.

*Example 3*

71 g. of D-gluconolactone and 55 g. of 4-dimethylaminobenzylhydrazine in 500 ml. of ethanol were refluxed for 4 hours. On cooling, the product, D-1-gluconoyl-2-(4-dimethylaminobenzyl)-hydrazine, crystallized and was recrystallized twice from hot water, M.P. 155–157°.

*Analysis.*—Calculated for $C_{15}H_{25}N_3O_6$: C, 52.5; H, 7.3; N, 12.3. Found: C, 53.3; H, 7.4; N, 12.7.

D-1-gluconoyl-2-(4 - dimethylaminobenzyl) - hydrazine hydrochloride was prepared as described in Example 1. The crystalline, hygroscopic product was precipitated with ether after cooling of the ethanolic reaction mixture.

*Example 4*

61 g. of benzyl hydrazine and 90 g. of D-gluconolactone in 500 ml. of ethanol were refluxed for 4 hours. On cooling, the product, D-1-gluconoyl-2-benzyl-hydrazine, crystallized and was recrystallized from water, M.P. 181–182°

*Analysis.*—Calculated for $C_{13}H_{20}N_2O_6$: C, 52.0; H, 6.7. Found: C, 52.3; H, 6.8.

*Example 5*

17.8 g. of D-galactonolactone and 13 g. of benzyl hydrazine in 250 ml. of ethanol were refluxed for 4 hours. On cooling, the D-1-galactonoyl-2-benzyl-hydrazine crystallized and was recrystallized twice from hot water, M.P. 204–205°.

*Analysis.*—Calculated for $C_{13}H_{20}N_2O_6$: C, 52.0; H, 6.7. Found: C, 52.4; H, 6.9.

Example 6

14.8 g. of D-arabonolactone and 13.0 g. of benzyl hydrazine in 250 ml. of ethanol were refluxed for 4 hours. On cooling, the product, D-1-arabonoyl-2-benzyl-hydrazine, crystallized and was recrystallized twice from hot water, M.P. 155–157°.

*Analysis.*—Calculated for $C_{12}H_{18}N_2O_5$: C, 53.2; H, 6.7. Found: C, 53.4; H, 6.9.

Example 7

18.5 g. of DL-α-methylphenethyl hydrazine hydrochloride in 200 ml. of ethanol were heated with 4 g. of sodium hydroxide in 50 ml. of water to free the hydrazine from the salt. To this solution were added 50 ml. of water and 15 g. of D-ribonolactone. The solution was refluxed for 4 hours and on cooling, the product crystallized. The D-1-ribonoyl-2-(1-methylphenethyl)-hydrazine was recrystallized twice from hot water, M.P. 171–173°.

*Analysis.*—Calculated for $C_{14}H_{22}N_2O_5$: C, 56.3; H, 7.4. Found: C, 56.1; H, 7.3.

Example 8

18.5 g. of DL-α-methylphenethyl hydrazine hydrochloride in 200 ml. of ethanol were treated with 4 g. of sodium hydroxide in 50 ml. of water. To this solution were added 50 g. of water and 18 g. of D-gluconolactone. The solution was refluxed for 4 hours and on cooling, D-1-gluconoyl-2-(1-methylphenethyl)-hydrazine crystallized. The product was recrystallized twice from hot water, M.P. 204–205°.

*Analysis.*—Calculated for $C_{15}H_{24}N_2O_6$: C, 54.8; H, 7.4. Found: C, 55.1; H, 7.3.

We claim:
1. A compound selected from the group consisting of those of the formula

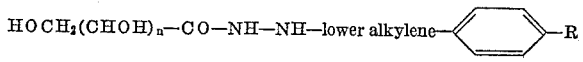

wherein R represents a member of the group consisting of hydrogen and di-lower alkylamino, and $n$ represents an integer from 3 to 4,
and medicinally acceptable acid addition salts thereof.

2. A compound of the formula

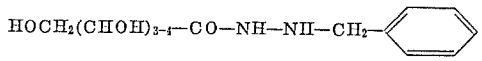

3. A compound of the formula

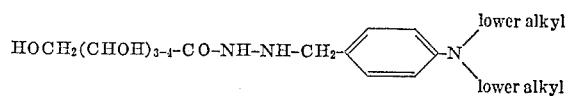

4. 1-ribonoyl-2-benzyl-hydrazine.
5. 1-ribonoyl-2-(4-dimethylaminobenzyl)-hydrazine.
6. 1-gluconoyl-2-(4-dimethylaminobenzyl)-hydrazine.
7. 1-gluconoyl-2-benzyl-hydrazine.
8. 1-galactonoyl-2-benzyl-hydrazine.
9. 1-arabonoyl-2-benzyl-hydrazine.
10. 1-ribonoyl-2-(1-methylphenethyl)-hydrazine.
11. 1-gluconoyl-2-(1-methylphenethyl)-hydrazine.

References Cited in the file of this patent
UNITED STATES PATENTS

| | | |
|---|---|---|
| 2,767,173 | Katz | Oct. 16, 1956 |
| 2,900,388 | Tien | Aug. 18, 1959 |
| 2,928,875 | Martin et al. | Mar. 15, 1960 |

OTHER REFERENCES

Weerman: "Recuell Travaux Chimiques," vol. 37, pp. 52–66 (1918).

Van Marle: "Recuell Travaux Chimiques," vol. 39, pp. 549–559 (1920).

Yale et al.: "Journal of the American Chemical Society," vol. 75, pages 1933–42 (1953).